US012780087B2

(12) United States Patent
Fukumoto

(10) Patent No.: US 12,780,087 B2
(45) Date of Patent: Nov. 3, 2026

(54) ASSISTANCE METHOD AND ASSISTANCE APPARATUS

(71) Applicant: Panasonic Automotive Systems Co., Ltd., Kanagawa (JP)

(72) Inventor: Satoshi Fukumoto, Tokyo To (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 3 days.

(21) Appl. No.: 19/039,477

(22) Filed: Jan. 28, 2025

(65) Prior Publication Data

US 2025/0170954 A1 May 29, 2025

Related U.S. Application Data

(63) Continuation of application No. PCT/JP2023/026084, filed on Jul. 14, 2023.

(30) Foreign Application Priority Data

Dec. 22, 2022 (JP) ................................ 2022-206045

(51) Int. Cl.
*B60Q 1/50* (2006.01)

(52) U.S. Cl.
CPC ............ *B60Q 1/525* (2013.01); *B60Q 1/547* (2022.05); *B60Q 2400/50* (2013.01)

(58) Field of Classification Search
CPC .... B60Q 1/525; B60Q 1/547; B60Q 2400/50; B60Q 2300/45; B60Q 1/00; B60Q 1/26; B60Q 1/52; G08G 1/16
See application file for complete search history.

(56) References Cited

U.S. PATENT DOCUMENTS

| | | | |
|---|---|---|---|
| 2017/0067609 A1 | 3/2017 | Ichikawa et al. |
| 2017/0255093 A1 | 9/2017 | Fujita et al. |
| 2018/0004020 A1 | 1/2018 | Kunii et al. |
| 2018/0009374 A1 | 1/2018 | Kim et al. |

(Continued)

FOREIGN PATENT DOCUMENTS

| | | |
|---|---|---|
| JP | 2002-074594 | 3/2002 |
| JP | 2002074594 A * | 3/2002 |
| JP | 2004-331021 | 11/2004 |

(Continued)

OTHER PUBLICATIONS

Sato Koichi, Aug. 25, 2000 English Machine Translation_ JP2002074594 A provided by Patent Translate by EPO and Google (Year : 2016).*

(Continued)

*Primary Examiner* — Ashley L Redhead, Jr.
(74) *Attorney, Agent, or Firm* — Greenblum & Bernstein, P.L.C.

(57) ABSTRACT

An assistance method according to the present disclosure includes: detecting a movement trajectory of a moving object moving around an own vehicle; acquiring a predicted path of the moving object based on the movement trajectory of the moving object; determining a display mode related to the moving object on a road surface on the predicted path of the moving object, based on the predicted path of the moving object; and controlling irradiation of the road surface with laser light based on the display mode related to the moving object.

12 Claims, 4 Drawing Sheets

(56) References Cited

U.S. PATENT DOCUMENTS

2025/0170954 A1* 5/2025 Fukumoto ................ B60Q 1/00

FOREIGN PATENT DOCUMENTS

| | | | | | |
|---|---|---|---|---|---|
| JP | 2005-157873 | | | 6/2005 | |
| JP | 2005-161977 | | | 6/2005 | |
| JP | 2005161977 | A | * | 6/2005 | |
| JP | 2006-031443 | | | 2/2006 | |
| JP | 2008-007079 | | | 1/2008 | |
| JP | 2015-164828 | | | 9/2015 | |
| JP | 2017-159698 | | | 9/2017 | |
| JP | 2018-069839 | | | 5/2018 | |
| JP | 2018-084955 | | | 5/2018 | |
| JP | 2018069839 | A | * | 5/2018 | ............... B60Q 1/50 |
| JP | 2021-154821 | | | 10/2021 | |
| WO | 2016/114048 | | | 7/2016 | |

OTHER PUBLICATIONS

Sugimoto Yoichi et al., Dec. 2, 2003 English Machine Translation_ JP2005161977 A provided by Patent Translate by EPO and Google (Year: 2003).*

Inoue Satoru et al., Oct. 26, 2016 English Machine Translation_ JP2018069839 A provided by Patent Translate by EPO and Google (Year: 2016).*

Office Action from Japan Patent Office (JPO) in Japanese Patent Appl. No. 2022-206045, dated Dec. 23, 2025, together with an English language translation.

International Search Report (ISR) from International Searching Authority (Japan Patent Office) in International Pat. Appl. No. PCT/JP2023/026084, dated Aug. 22, 2023, together with an English language translation.

* cited by examiner

ASSISTANCE METHOD AND ASSISTANCE APPARATUS

CROSS-REFERENCE TO RELATED APPLICATIONS

This application is a continuation of International Application No. PCT/JP2023/026084, filed on Jul. 14, 2023 which claims the benefit of priority of the prior Japanese Patent Application No. 2022-206045, filed on Dec. 22, 2022, the entire contents of which are incorporated herein by reference.

FIELD

The present disclosure relates to an assistance method and an assistance apparatus.

BACKGROUND

Conventionally, for example, a technology of causing another vehicle to recognize the presence of an own vehicle by emitting laser light, for example, in order to prevent a collision accident between vehicles or between a vehicle and a pedestrian in an environment with low visibility such as nighttime has been known.

A related technique is described in JP 2005-157873 A.

Under such circumstances, there is room for improvement of information to be recognized by another vehicle by irradiation with laser light from the viewpoint of further improvement in safety.

An object of the present disclosure is to improve traffic safety in an environment with low visibility.

SUMMARY

An assistance method according to the present disclosure includes: detecting a movement trajectory of a moving object moving around an own vehicle; acquiring a predicted path of the moving object based on the movement trajectory of the moving object; determining a display mode related to the moving object on a road surface on the predicted path of the moving object, based on the predicted path of the moving object; and controlling irradiation of the road surface with laser light based on the display mode related to the moving object.

DETAILED DESCRIPTION

Figure 1:
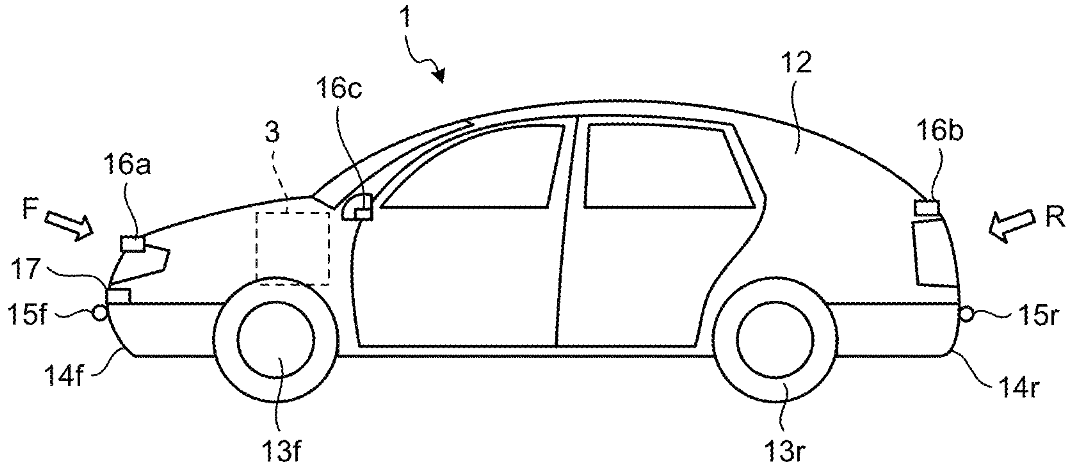
FIG. 1 is a diagram schematically illustrating an example of a vehicle on which an assistance apparatus according to an embodiment is mounted.

Hereinafter, embodiments of an assistance apparatus, a vehicle, an assistance method, and a program according to the present disclosure will be described with reference to the drawings.

In the description of the present disclosure, components having the same or substantially the same functions as those described above with reference to the previously described drawings are denoted by the same reference numerals, and the description thereof may be appropriately omitted. In addition, even in the case of representing the same or substantially the same portion, the dimensions and ratios may be expressed differently from each other depending on the drawings. Furthermore, for example, in order to ensure visibility of the drawings, in the description of each drawing, just main components are denoted by reference numerals, and even components having the same or substantially the same functions as those described above in the previous drawings may not be denoted by reference numerals.

FIG. 1 is a diagram schematically illustrating an example of a vehicle on which an assistance apparatus 3 according to an embodiment is mounted. As illustrated in FIG. 1, a vehicle 1 includes a vehicle body 12 and two pairs of wheels 13 disposed in a predetermined direction on the vehicle body 12. The two pairs of wheels 13 include a pair of front tires **13*f* and a pair of rear tires 13*r***.

Here, the front tire **13*f* according to the embodiment is an example of a first wheel. The rear tire 13*r* according to the embodiment is an example of a second wheel. Although FIG. 1 illustrates the vehicle 1 including four wheels 13, the present disclosure is not limited thereto. The vehicle 1 may include at least one front tire 13*f* and at least one rear tire 13*r*. The number of wheels 13 of the vehicle 1** may be two, three, or five or more.

The vehicle body 12 is supported by the wheels 13. The vehicle 1 includes a driving machine (not illustrated), and is movable by driving at least one wheel (driving wheel) of the wheels 13 of the vehicle 1 by power of the driving machine. As the driving machine, any driving machine such as an engine using gasoline, hydrogen, or the like as a fuel, a motor using electric power from a battery, or a combination of an engine and a motor can be applied. In this case, the predetermined direction in which the two pairs of wheels 13 are disposed is a traveling direction of the vehicle 1. The vehicle 1 can move forward or backward by shifting a gear (not illustrated) or the like. The vehicle 1 can also make right or left turns by steering.

The vehicle body 12 has a front end portion F which is an end portion adjacent to the front tire **13*f*, and a rear end portion R which is an end portion adjacent to the rear tire 13*r*. The vehicle body 12** has a substantially rectangular shape in top view, and four corners of the substantially rectangular shape may be referred to as end portions.

A pair of bumpers 14 is provided near a lower end of the vehicle body 12 at the front end portions F and rear end portions R of the vehicle body 12. Among the pair of bumpers 14, a front bumper **14*f* covers the entire front surface and parts of side surfaces in the vicinity of a lower end portion of the vehicle body 12. Among the pair of bumpers 14, a rear bumper 14*r* covers the entire rear surface and parts of the side surfaces in the vicinity of the lower end portion of the vehicle body 12**.

A sonar (sound navigation and ranging) 15 that transmit and receive sound waves such as ultrasonic waves is disposed at a predetermined end portion of the vehicle body 12. The sonar 15 includes wave transmitting/receiving units **15*f*** and 15*r*. For example, one or more wave transmitting/receiving units 15*f* are disposed on the front bumper 14*f*, and one or more wave transmitting/receiving units 15*r* are disposed on the rear bumper 14*r*. Furthermore, the number of wave transmitting/receiving units 15*f* and 15*r* and/or positions of the wave transmitting/receiving units 15*f* and 15*r* are not limited to those in the example illustrated in FIG. 1, and can be changed as appropriate. For example, the vehicle 1 may include the wave transmitting/receiving units 15*f* and 15*r* positioned on the left and right sides of the vehicle 1.

In the present embodiment, the sonar 15 using sound waves such as ultrasonic waves is exemplified, but the present disclosure is not limited thereto. For example, the vehicle 1 may include a radar that transmits and receives electromagnetic waves instead of the sonar 15 or in addition to the sonar 15. Furthermore, the sonar 15 may be simply referred to as a sensor.

The sonar 15 detects an obstacle around the vehicle 1 based on a sound wave transmission/reception result. The sonar 15 measures a distance between the obstacle around the vehicle 1 and the vehicle 1 based on the sound wave transmission/reception result. Here, the sonar 15 according to the embodiment is an example of an on-vehicle sensor.

In addition, the vehicle 1 includes all-around cameras 16 that image the surroundings of the vehicle 1. As an example, the vehicle 1 includes, as the all-around cameras 16, a front camera 16*a* that images a front area, a rear camera 16*b* that images a rear area, a left side camera 16*c* that images a left side area, and a right side camera (not illustrated) that images a right side area.

Hereinafter, in a case where the front camera 16*a*, the rear camera 16*b*, the left side camera 16*c*, and the right side camera are not particularly distinguished from each other, the front camera 16*a*, the rear camera 16*b*, the left side camera 16*c*, and the right side camera are simply referred to as the all-around camera 16. The position of the all-around camera 16 and/or the number of all-around cameras 16 is not limited to those in the example illustrated in FIG. 1 and can be changed as appropriate. For example, the vehicle 1 may include just two cameras, the front camera 16*a* and the rear camera 16*b*. Alternatively, the vehicle 1 may further include another camera in addition to those in the above-described example.

The all-around camera 16 is a camera capable of capturing an image of the surroundings of the vehicle 1, and is, for example, a camera that captures a color image. The captured image captured by the all-around camera 16 may be a moving image or a still image. In addition, the all-around camera 16 may be a camera built on the vehicle 1, a camera of a drive recorder retrofitted to the vehicle 1, or the like. Here, the all-around camera 16 according to the embodiment is an example of the on-vehicle sensor.

At least one irradiation device 17 is provided at a predetermined end portion of the vehicle body 12. FIG. 1 illustrates a case where the irradiation device 17 is provided at the front end portion F of the vehicle 1. The irradiation device 17 may be provided on a vehicle interior side of a windshield of the vehicle 1, such as at a position near a rearview mirror. Further, the irradiation device 17 may be provided on a side surface of the vehicle 1, such as a side mirror, or may be provided at the rear end portion R.

The irradiation device 17 includes a light emitter such as a light emitting diode (LED) and an optical system that converges, expands, or deflects light from the light emitter. The irradiation device 17 switches on/off of light emission by the light emitter under the control of the assistance apparatus 3. In addition, the irradiation device 17 operates the optical system such that the light from the light emitter has a predetermined irradiation shape at a predetermined position on a road surface in front of the vehicle 1 in the traveling direction under the control of the assistance apparatus 3. In other words, the irradiation device 17 is configured to be able to irradiate the road surface with laser light in a visible light range. As an example, the irradiation device 17 irradiates the road surface positioned in the vehicle traveling direction with visible laser light such that the light has an irradiation shape corresponding to a display mode determined by the assistance apparatus 3.

The light emitter of the irradiation device 17 is not limited to the LED, and may be another light source. For example, the light emitter may be a solid laser such as a semiconductor laser, a gas laser such as a He—Ne laser, or a liquid laser. The light emitter may be a high-intensity discharge (HID) lamp, a halogen lamp, or a lamp shared with a front light of the vehicle 1. Alternatively, the irradiation device 17 may be integrated with the front light of the vehicle 1.

The irradiation device 17 may be configured to be able to change a color or a luminance of the laser light with which the road surface is irradiated. The color or luminance may be changed depending on an output of the light emitter or may be changed by a filter of the optical system.

The irradiation device 17 may be a projector that projects an image or the like on the road surface positioned in the vehicle traveling direction. Further, the irradiation device 17 may be configured to cooperate with another irradiation device such as a headlight of the vehicle 1. For example, when the irradiation device 17 irradiates the road surface with the laser light in a desired display mode, the assistance apparatus 3 may control to reduce a light quantity of the headlight.

As illustrated in FIG. 1, the assistance apparatus 3 is mounted on the vehicle 1. The assistance apparatus 3 is an information processing device that can be mounted on the vehicle 1, and is implemented by, for example, an electronic control unit (ECU) or an on board unit (OBU) provided inside the vehicle 1. Alternatively, the assistance apparatus 3 may be an external computer installed near a dashboard of the vehicle 1. The assistance apparatus 3 may also serve as a car navigation system or the like.

Figure 2:
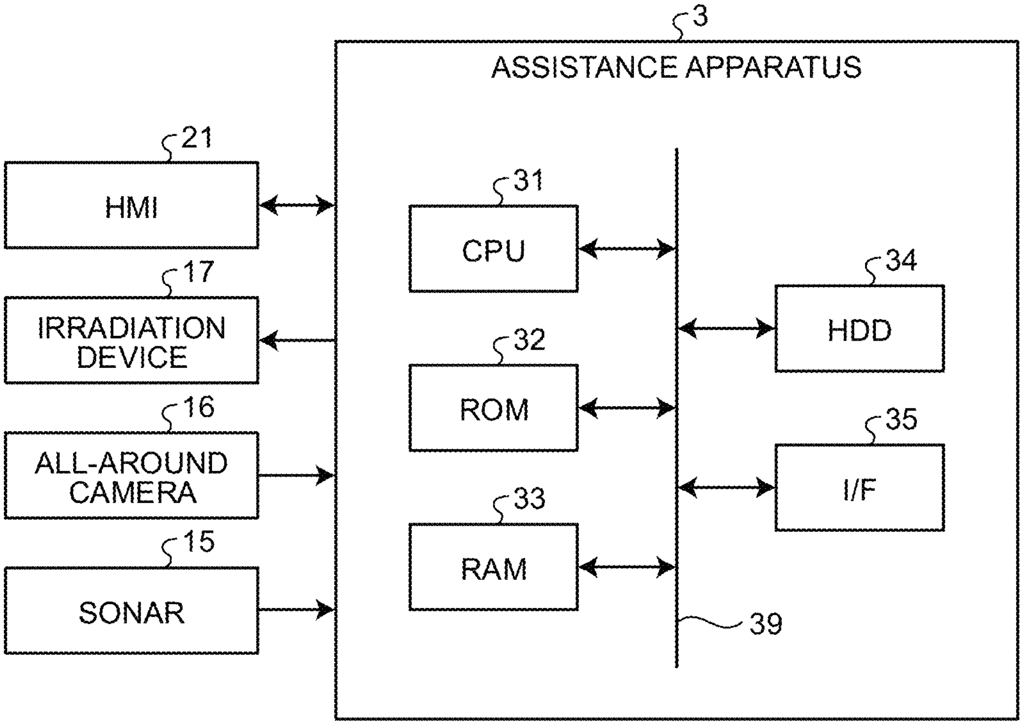
FIG. 2 is a diagram illustrating an example of a hardware configuration of the assistance apparatus according to the embodiment.

FIG. 2 is a diagram illustrating an example of a hardware configuration of the assistance apparatus 3 according to the embodiment. As illustrated in FIG. 2, the assistance apparatus 3 includes a central processing unit (CPU) 31, a read only memory (ROM) 32, a random access memory (RAM) 33, a hard disk drive (HDD) 34, and an interface (I/F) 35. The CPU 31, the ROM 32, the RAM 33, the HDD 34, and the I/F (interface) 35 are mutually connected by a bus 39 or the like, and have a hardware configuration using a normal computer.

As illustrated in FIG. 2, the vehicle 1 further includes an HMI 21. The sonar 15, the all-around camera 16, the irradiation device 17, and the HMI 21 are connected to the assistance apparatus 3 via, for example, the I/F 35.

The HMI 21 is an interface for outputting a notification such as assistance information to a driver of the vehicle 1. The HMI 21 is provided, for example, around a driver's seat of the vehicle 1. It is enough that the HMI 21 can output a predetermined notification so as to be recognizable by the driver of the vehicle 1, and the HMI 21 may be provided at another portion around the driver's seat, such as a rear seat.

The HMI 21 may be a head mounted display (HMD) mounted on the head of the driver. Furthermore, the HMI 21 may be a projection type display device such as a head up display (HUD) that projects a video (virtual image) on a front of the driver, for example, a display region provided on a windshield 180 or a dashboard 190. Furthermore, the HMI 21 is not limited to a device that displays a video, and may include other notification devices such as a speaker and a horn that output a notification sound, a warning sound, and a sound.

The CPU 31 is an arithmetic device that controls the entire assistance apparatus 3. The CPU 31 loads a program stored in the ROM 32 or the HDD 34 into the RAM 33 and executes the program, thereby implementing each processing described below.

The CPU 31 according to the embodiment is an example of a processor in the assistance apparatus 3. As the processor, another processor may be provided instead of the CPU 31 or in addition to the CPU 31. As the another processor, various processors such as a graphics processing unit (GPU), an application specific integrated circuit (ASIC), and a field programmable gate array (FPGA) can be used as appropriate.

The ROM 32 stores programs, parameters, and the like that implement various types of processing executed by the CPU 31.

The RAM 33 is, for example, a main storage device of the assistance apparatus 3, and temporarily stores data necessary for various types of processing executed by the CPU 31.

The HDD 34 stores various data, programs, and the like used by the assistance apparatus 3. As an example, the HDD 34 holds past movement of a moving object as a monitoring target detected by an advanced driving assistant system (ADAS) such as the sonar 15 or the all-around camera 16, a calculated predicted path as a monitoring target, determined irradiation contents, and the like. Various storage media and storage devices such as a solid state drive (SSD) and a flash memory can be used as appropriate instead of the HDD 34 or in addition to the HDD 34.

The I/F 35 is an interface for transmitting and receiving data. The I/F 35 receives data from another device provided on the vehicle 1, for example, the on-vehicle sensor such as the sonar 15 or the all-around camera 16. In addition, the I/F 35 transmits data to other devices provided on the vehicle 1, for example, the irradiation device 17 and the HMI 21.

The I/F 35 may acquire a signal from an accelerator sensor (not illustrated) that detects an operation amount of an accelerator pedal by the driver and a signal from a brake sensor (not illustrated) that detects an operation amount of a brake pedal by the driver, or operation amounts based on these signals.

The I/F 35 may transmit and receive information to and from another ECU mounted on the vehicle 1 via a controller area network (CAN) or the like on the vehicle 1, or may communicate with an information processing device outside the vehicle 1 via a network such as the Internet. As an example, the I/F 35 acquires vehicle information regarding a state of the vehicle 1 such as a vehicle speed pulse, each speed including a yaw rate, an acceleration, position information, and shift information from another ECU or various on-vehicle sensors of the vehicle 1 via the CAN, for example.

FIG. 2 illustrates a case where the sonar 15, the all-around camera 16, the irradiation device 17, and the HMI 21 are not included in the assistance apparatus 3, but the present disclosure is not limited thereto. Some or all of the sonar 15, the all-around camera 16, the irradiation device 17, and the HMI 21 may be included in the assistance apparatus 3. Further, the irradiation device 17 may be configured as a part of the HMI 21.

Figure 3:
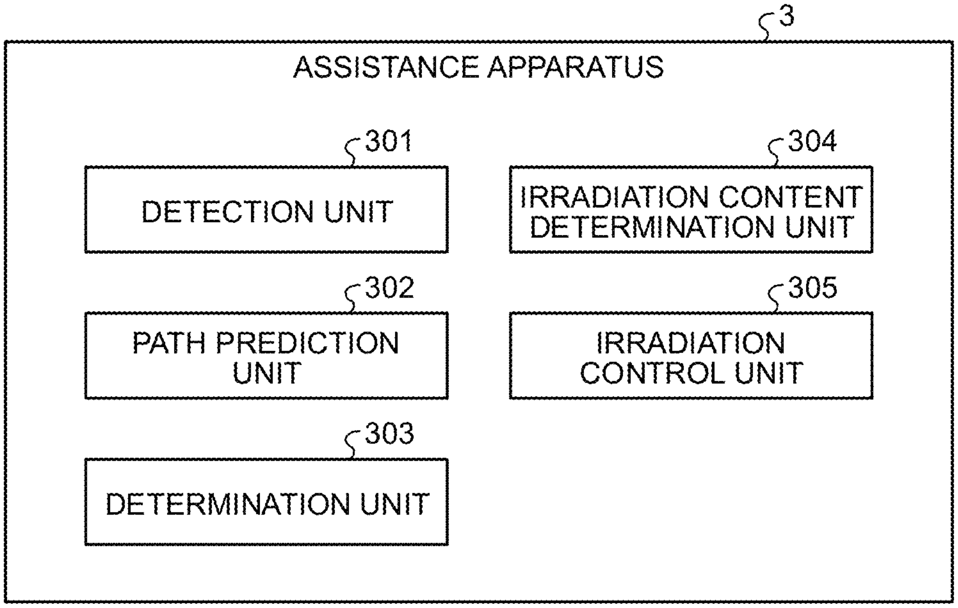
FIG. 3 is a diagram illustrating an example of a functional configuration of the assistance apparatus according to the embodiment.

FIG. 3 is a diagram illustrating an example of a functional configuration of the assistance apparatus according to the embodiment. The assistance apparatus 3 executes a program loaded into the RAM 33 by the CPU 31 to implement functions as a detection unit 301, a path prediction unit 302, a determination unit 303, an irradiation content determination unit 304, and an irradiation control unit 305 as illustrated in FIG. 3.

The detection unit 301 monitors movement of a moving object moving around an own vehicle and detects a movement trajectory. For example, the detection unit 301 acquires data from the on-vehicle sensor of the ADAS provided on the vehicle 1 such as the sonar 15 or the all-around camera 16 via, for example, the I/F 35. In addition, the detection unit 301 detects past movement of a monitoring target based on the acquired data.

Here, the monitoring target is, for example, a moving object moving around the own vehicle, and may also include the own vehicle. A movement trajectory of the own vehicle may be acquired based on an output of a global navigation satellite system (GNSS) sensor such as a global positioning system (GPS) sensor or other on-vehicle sensors such as a wheel speed sensor, an inertial sensor, and an acceleration sensor.

In addition, the moving object is at least one of a vehicle other than the own vehicle or a pedestrian. More specifically, the moving object is at least one of a person such as a pedestrian and a mobility device such as a bicycle or an automobile that transports a person or an object. The mobility device includes various vehicles such as a bicycle, a motorcycle, an automobile, a kick scooter, and a senior car that can move along a movement path provided on the ground. In addition, the mobility device may be driven by human power or may be driven using power of a prime mover or a motor. Further, the mobility device may be configured to be capable of autonomous driving.

The path prediction unit 302 acquires a predicted path of the moving object based on the movement trajectory of the moving object detected by the detection unit 301. In other words, the path prediction unit 302 predicts future movement of the moving object based on the past movement of the moving object detected by the detection unit 301.

The determination unit 303 determines a collision risk between at least two moving objects moving around the own vehicle based on predicted paths of the at least two moving objects.

The irradiation content determination unit 304 determines a display mode related to the moving object on the road surface on the predicted path of the moving object based on the predicted path of the moving object moving around the own vehicle.

As an example, the display mode related to the moving object includes a display indicating the predicted path of the moving object.

As an example, the display mode related to the moving object includes a display indicating the type of the moving object. The type of the moving object indicates the type of the corresponding moving object among various moving objects, the type being any one of a vehicle other than the own vehicle and a pedestrian. For example, the type of the moving object includes at least one of "automobile", "motorcycle", "bicycle", or "pedestrian", and indicates the type of the moving object that is any one of "automobile", "motorcycle", "bicycle", and "pedestrian". In addition, the type of the moving object may indicate, for example, a "passenger car" or a "truck" among automobiles.

As an example, the display mode related to the moving object includes a display indicating a stop line for at least one of at least two moving objects having a collision risk in a case where there is a collision risk between the moving objects.

The irradiation control unit 305 controls irradiation of the road surface in front of the own vehicle or the moving object moving around the own vehicle with the laser light based on the display mode related to the moving object.

Figure 4:
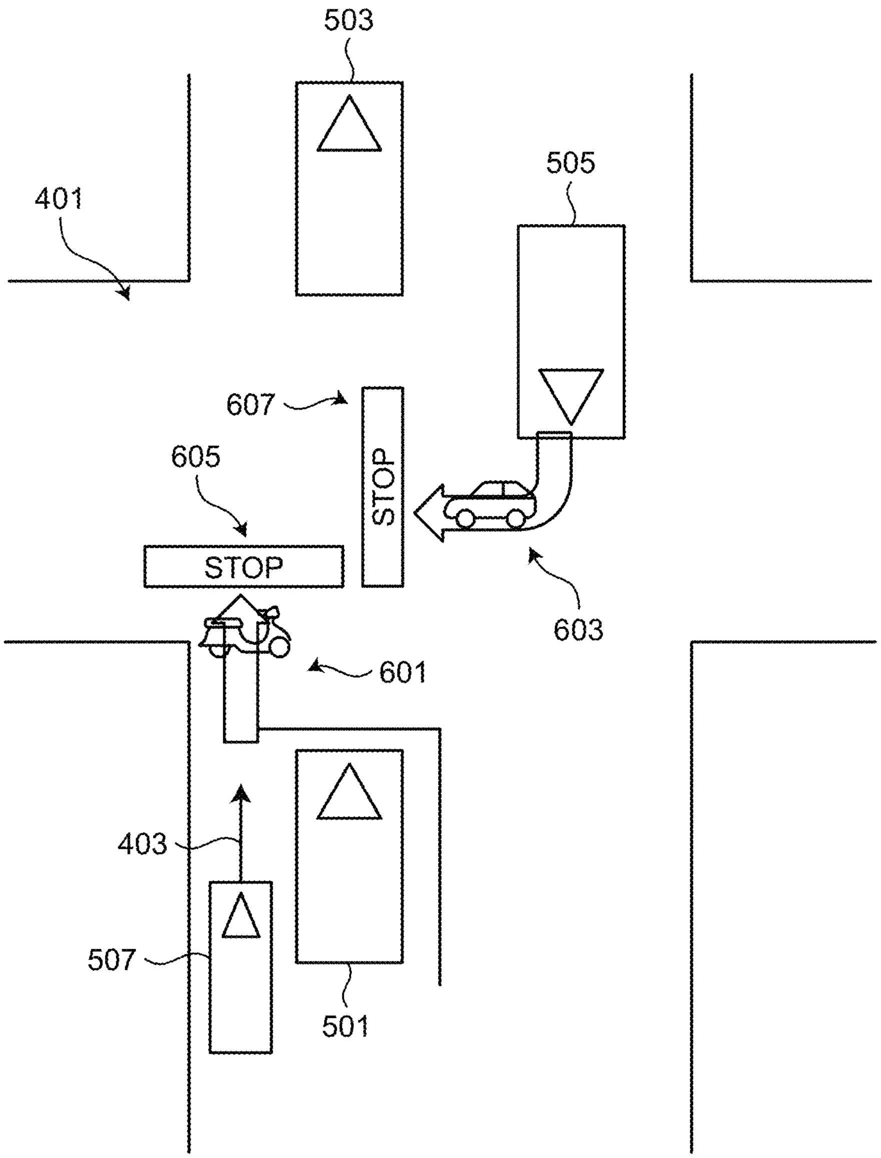
FIG. 4 is a diagram illustrating an example of a display mode in assistance processing according to the embodiment.

FIG. 4 is a diagram illustrating an example of the display mode in assistance processing according to the embodiment. FIG. 4 illustrates a moving object 501 as an example of the vehicle 1 on which the assistance apparatus 3 according to the embodiment is mounted and moving objects 503, 505, and 507 moving around the moving object 501. In FIG. 4, triangles attached to the respective moving objects 501, 503, 505, and 507 indicate movement directions of the respective moving objects 501, 503, 505, and 507.

In the scene illustrated in FIG. 4, the moving object 501 is, for example, an automobile that tries to move straight through an intersection 401. The moving object 501 is stopped without entering the intersection 401 because a front of the moving object 501 is blocked by the moving object such as the moving object 503 despite a signal being green.

In the scene illustrated in FIG. 4, the moving object 503 is, for example, an automobile that has moved straight through the intersection 401 prior to the moving object 501. The moving object 503 has not passed through the intersection 401 due to a traffic jam in front of the moving object 503.

In the scene illustrated in FIG. 4, the moving object 505 is, for example, an automobile whose traveling direction is opposite to that of the moving object 501 and which is about to turn right at the intersection 401, in other words, an oncoming right turning vehicle of the moving object 501. More specifically, the moving object 505 enters the intersection 401, turns right, and passes between the moving objects 501 and 503.

In the scene illustrated in FIG. 4, the moving object 507 is, for example, a motorcycle that tries to pass by a left side of the moving object 501 and move straight through the intersection 401.

As an example, the irradiation content determination unit 304 determines a display mode related to the moving object 507 on a road surface on a predicted path 403 of the moving object 507 based on the predicted path 403 of the moving object 507 moving around the own vehicle. Here, a display 601 including an arrow indicating the predicted path 403 of the moving object 507 and an icon indicating the type of the moving object 507 is an example of the display mode related to the moving object 507. As an example, the icon indicating the type of the moving object 507 is an icon indicating "motorcycle" as illustrated in FIG. 4.

As an example, the irradiation content determination unit 304 determines a display mode related to the moving object 505 on a road surface on a predicted path of the moving object 505 based on the predicted path of the moving object 505 moving around the own vehicle. Here, a display 603 including an arrow indicating the predicted path of the moving object 505 and an icon indicating the type of the moving object 505 is an example of the display mode related to the moving object 505. As an example, the icon indicating the type of the moving object 505 is an icon indicating "automobile (passenger car or four-wheeled vehicle)" as illustrated in FIG. 4.

Display of the displays 601 and 603, in other words, irradiation of the predicted path and the type of road surface, may be performed in a case where it is determined that a dangerous situation has occurred. In other words, the irradiation content determination unit 304 may determine the display mode including the predicted path and the type in a case where the dangerous situation has occurred. Alternatively, the irradiation control unit 305 may start control of irradiation with laser light for the road surface for implementing the display mode including the predicted path and the type in a case where the dangerous situation has occurred.

Here, the dangerous situation is a case where it is determined that there is a collision risk between at least two moving objects among the plurality of moving objects 501, 503, 505, and 507. As an example, in a case where the predicted paths intersect, the determination unit 303 determines that there is a collision risk between the moving objects whose predicted paths intersect each other.

As an example, in a case where it is determined that the dangerous situation has occurred, the irradiation content determination unit 304 determines the display mode related to the moving object 507, the display mode including a display 605 indicating a stop line for the moving object 507 on the road surface on the predicted path of the moving object 507.

As an example, in a case where it is determined that the dangerous situation has occurred, the irradiation content determination unit 304 determines the display mode related to the moving object 505, the display mode including a display 607 indicating a stop line for the moving object 505 on the road surface on the predicted path of the moving object 505.

Display of the displays 605 and 607, in other words, the stop lines, on the road surface may be performed regardless of whether or not it is determined that the dangerous situation has occurred. In other words, each of the displays 605 and 607 may be displayed on the road surface together with the displays 601 and 603. In this case, the determination unit 303 does not have to determine whether the dangerous situation has occurred. Alternatively, the determination unit 303 does not have to be provided in the assistance apparatus 3.

Figure 5:
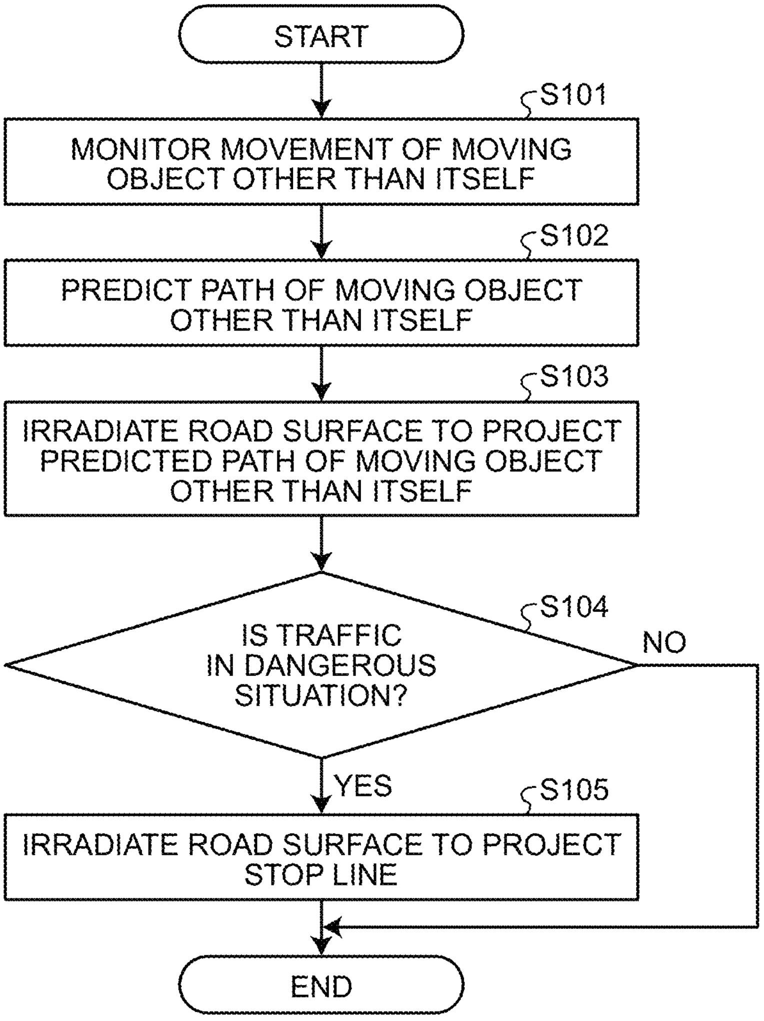
FIG. 5 is a flowchart illustrating an example of a flow of the assistance processing executed by the assistance apparatus according to the embodiment.

Next, a flow of the assistance processing executed by the assistance apparatus 3 configured as described above will be described. FIG. 5 is a flowchart illustrating an example of a flow of the assistance processing executed by the assistance apparatus 3 according to the embodiment.

The detection unit 301 monitors movement of a moving object other than itself (S101). The path prediction unit 302 also predicts a path of the moving object other than itself (S102).

The irradiation content determination unit 304 determines an irradiation mode for displaying the predicted path on the road surface. Furthermore, the irradiation control unit 305 causes the irradiation device 17 to irradiate the road surface with laser light to irradiate the road surface to project the predicted path of a moving object other than itself in the determined irradiation mode (S103).

The determination unit 303 determines whether traffic around the vehicle 1 is in the dangerous situation (S104). In a case where it is not determined that the traffic is in the dangerous situation (S104: No), the flow of FIG. 5 ends.

On the other hand, in a case where it is determined that the traffic is in the dangerous situation (S104: Yes), the irradiation content determination unit 304 determines a display mode of displaying a stop line on the road surface. Furthermore, the irradiation control unit 305 causes the irradiation device 17 to irradiate the road surface with laser light to project the stop line for the moving object other than itself on the road surface in the determined irradiation mode (S105). Thereafter, the flow of FIG. 5 ends.

The assistance apparatus 3 may irradiate the road surface with laser light in a display mode related to the own vehicle without being limited to the display mode related to the moving object moving around the own vehicle. In other words, the detection unit 301 may acquire a predicted path of the own vehicle based on the movement trajectory of the own vehicle. In addition, the irradiation content determination unit 304 may determine the display mode related to the own vehicle on the road surface on the predicted path of the own vehicle based on the predicted path of the own vehicle without being limited to the display mode related to another moving object around the own vehicle. Furthermore, the irradiation control unit 305 may control the irradiation of the road surface with the laser light based on the display mode related to the own vehicle.

The detection unit 301 may acquire the vehicle information such as the position, the speed, the movement direction, and the type of the moving object moving around the own vehicle by V2X communication such as vehicle-to-vehicle communication or road-to-vehicle communication.

Furthermore, the irradiation control unit 305 may transmit a control signal by, for example, V2X communication to cause not just the irradiation device 17 of the own vehicle but also the irradiation device 17 mounted on the moving object moving around the own vehicle or the irradiation device 17 installed on the road surface to irradiate the road surface with laser light.

The assistance apparatus 3 may perform control of sounding the horn instead of or in addition to the irradiation of the road surface to project the stop line.

As described above, the assistance apparatus 3 according to the embodiment predicts the future path of another vehicle from the past movement of another vehicle, and reports the presence of another vehicle by irradiating the road surface with laser light in the display mode based on the predicted path. In addition, the assistance apparatus 3 according to the embodiment reports a risk not just for the own vehicle, but also for other vehicles, another vehicle and a pedestrian, and the like, in a case where it is determined that there is a risk.

With such a configuration, it is possible to notify the driver of the own vehicle and the driver of another vehicle of the presence of a motorcycle or the like that passes by the side of the own vehicle. Therefore, even in an environment with blind spots or low visibility such as nighttime or traffic congestion, it is possible to improve safety not just for the own vehicle but also for another vehicle, by preventing an involuntary accident.

In each embodiment described above, "determining whether it is A" may mean "determining that it is A", "determining that it is not A", or "determining whether or not it is A".

The program executed by the assistance apparatus 3 of each embodiment described above is provided by being recorded in a computer-readable recording medium such as a CD-ROM, an FD, a CD-R, or a DVD as a file in an installable format or an executable format.

Further, the program executed by the assistance apparatus 3 according to each embodiment described above may be stored on a computer connected to a network such as the Internet and be provided by being downloaded via the network. Further, the program executed by the assistance apparatus 3 may be provided or distributed via a network such as the Internet.

In addition, the program executed by the assistance apparatus 3 according to each embodiment described above may be provided by being incorporated in the ROM or the like in advance.

In addition, the program executed by the assistance apparatus 3 according to each embodiment described above has a module configuration including the respective functional units (the detection unit 301, the path prediction unit 302, the determination unit 303, the irradiation content determination unit 304, and the irradiation control unit 305), and as actual hardware, the CPU 31 reads and executes the program from the ROM 32 or the HDD 34, whereby each functional unit is loaded into the RAM 33, and each functional unit is generated on the RAM 33.

According to at least one embodiment described above, traffic safety in an environment with low visibility can be improved.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and equivalents thereof.

Supplementary Note

The following technology is disclosed by the above description of the embodiment.

(1)

An assistance method including:
- detecting a movement trajectory of a moving object moving around an own vehicle;
- acquiring a predicted path of the moving object based on the movement trajectory of the moving object;
- determining a display mode related to the moving object on a road surface on the predicted path of the moving object, based on the predicted path of the moving object; and
- controlling irradiation of the road surface with laser light based on the display mode related to the moving object.

(2)

The assistance method according to (1), further including:
- determining a collision risk between at least two moving objects moving around the own vehicle based on predicted paths of the at least two moving objects; and
- starting control of irradiation of the road surface with the laser light in a case where there is the collision risk.

(3)

The assistance method according to (1) or (2), wherein the display mode related to the moving object includes a display of the predicted path of the moving object.

(4)

The assistance method according to any of (1) to (3), wherein the display mode related to the moving object includes a display of a type of the moving object.

(5)

The assistance method according to (4), wherein the type of the moving object includes at least one of an automobile, a motorcycle, a bicycle, or a pedestrian.

(6)

The assistance method according to any of (1) to (5), wherein the moving object is at least one of a vehicle other than the own vehicle or a pedestrian.

(7)

The assistance method according to any of (1) to (6), further including:

determining a collision risk between at least two moving objects moving around the own vehicle based on predicted paths of the at least two moving objects; and determining the display mode related to the moving object including a display of a stop line for the moving object in a case where there is the collision risk.

(8)

An assistance apparatus including:

a detection unit configured to detect a movement trajectory of a moving object moving around an own vehicle;

a path prediction unit configured to acquire a predicted path of the moving object based on the movement trajectory of the moving object;

an irradiation content determination unit configured to determine a display mode related to the moving object on a road surface on the predicted path of the moving object, based on the predicted path of the moving object; and an irradiation control unit configured to control irradiation of the road surface with laser light based on the display mode related to the moving object.

(9)

The assistance apparatus according to (8), further including:

a determination unit configured to determine a collision risk between at least two moving objects moving around the own vehicle based on predicted paths of the at least two moving objects, in which the irradiation control unit is configured to start control of irradiation of the road surface with the laser light in a case where there is the collision risk.

(10)

The assistance apparatus according to (8) or (9), in which the irradiation content determination unit is configured to determine the display mode related to the moving object including a display of the predicted path of the moving object.

(11)

The assistance apparatus according to any of (8) to (10), in which the irradiation content determination unit is configured to determine the display mode related to the moving object including a display of a type of the moving object.

(12)

The assistance apparatus according to (11), in which the type of the moving object includes at least one of an automobile, a motorcycle, a bicycle, or a pedestrian.

(13)

The assistance apparatus according to any of (8) to (12), in which the moving object is at least one of a vehicle other than the own vehicle or a pedestrian.

(14)

The assistance apparatus according to any of (8) to (13), further including a determination unit configured to determine a collision risk between at least two moving objects moving around the own vehicle based on predicted paths of the at least two moving objects, in which the irradiation content determination unit is configured to determine the display mode related to the moving object including a display of a stop line for the moving object in a case where there is the collision risk.

(15)

The assistance apparatus according to any of (8) to (14), further including an irradiation device configured to irradiate the road surface on the predicted path of the moving object with the laser light.

(16)

A vehicle including:

the assistance apparatus according to any of (8) to (14);

an on-vehicle sensor configured to detect the moving object; and an irradiation device configured to irradiate the road surface on the predicted path of the moving object with the laser light.

(17)

A program for causing a computer to execute the assistance method according to any of (1) to (7).

(18)

A recording medium (computer program product) on which the program to be executed by a computer, according to (17), is recorded.

Although the above-described present embodiment and the modification have been described above, the embodiment and the modification example have been presented as examples, and are not intended to limit the scope of the invention. The above-described novel embodiments and modification examples can be implemented in various other forms, and various omissions, substitutions, and changes can be made without departing from the gist of the invention. The above-described present embodiments and modification examples are included in the scope or gist of the invention, and are included in the invention described in the claims and the equivalent scope thereof.

What is claimed is:

1. An assistance method, comprising:

detecting movement trajectories of at least two moving objects moving around an own vehicle;

acquiring predicted paths of each of the at least two moving objects based on the movement trajectories of the at least two moving objects;

determining a display mode including the predicted paths of the at least two moving objects on a road surface based on the predicted paths of the at least two moving objects; and controlling irradiation of the road surface with laser light based on the display mode including the predicted paths of the at least two moving objects.

2. The assistance method according to claim 1, further comprising:

determining a collision risk between the at least two moving objects moving around the own vehicle based on the predicted paths of each of the at least two moving objects; and starting control of the irradiation of the road surface with the laser light in a case where there is the collision risk.

3. The assistance method according to claim 1, wherein the display mode includes a display of a type of each of the at least two moving objects.

4. The assistance method according to claim 3, wherein the type of each of the at least two moving objects are any two of vehicles other than the own vehicle, motorcycles, bicycles, or pedestrians.

5. The assistance method according to claim 1, further comprising:

determining a collision risk between at least two moving objects moving around the own vehicle based on the predicted paths of each of the at least two moving objects; and determining the display mode including a display of a stop line for the at least two moving objects in a case where there is the collision risk.

6. The assistance method according to claim 1, wherein the at least two moving objects are in blind spots with each other.

7. The assistance method according to claim 1, wherein the controlling of the irradiation of the road surface starts when the own vehicle is located around an intersection.

8. An assistance apparatus, comprising:

a processor; and a memory including instructions that, when executed by the processor, cause the processor to perform operations, the operations comprising:

detecting movement trajectories of at least two moving objects moving around an own vehicle;

acquiring predicted paths of each of the at least two moving objects based on the movement trajectories of the at least two moving objects;

determining a display mode including the predicted paths of the at least two moving objects on a road surface based on the predicted paths of the at least two moving objects; and controlling irradiation of the road surface with laser light based on the display mode including the predicted paths of the at least two moving objects.

9. The assistance apparatus according to claim 8, wherein the operations further comprises:

determining a collision risk between the at least two moving objects moving around the own vehicle based on the predicted paths of each of the at least two moving objects; and starting control of the irradiation of the road surface with the laser light in a case where there is the collision risk.

10. The assistance apparatus according to claim 8, wherein the display mode includes a display of a type of each of the at least two moving objects.

11. The assistance apparatus according to claim 10, wherein the type of each of the at least two moving objects are any two of vehicles other than the own vehicle, motorcycles, bicycles, or a pedestrians.

12. The assistance apparatus according to claim 8, wherein the operations further comprises:

determining a collision risk between at least two moving objects moving around the own vehicle based on the predicted paths of each of the at least two moving objects; and determining the display mode including a display of a stop line for the at least two moving objects in a case where there is the collision risk.

* * * * *